United States Patent [19]
Kim et al.

[11] Patent Number: 5,458,818
[45] Date of Patent: Oct. 17, 1995

[54] INSULATED MOLD STRUCTURE FOR INJECTION MOLDING OF OPTICAL DISKS

[75] Inventors: Bang M. Kim, Schenectady; Matthew F. Niemeyer, North Chatham, both of N.Y.

[73] Assignee: General Electric Co., Pittsfield, Mass.

[21] Appl. No.: 114,540

[22] Filed: Aug. 31, 1993

[51] Int. Cl.[6] .............................. B29D 11/00; B29C 43/02
[52] U.S. Cl. ..................... 264/1.33; 249/114.1; 249/134; 264/328.16; 425/810
[58] Field of Search ............................ 264/1.3, 106, 107, 264/40.6, 328.16, 327, DIG. 46; 249/114.1, 116, 134, 135; 425/810, DIG. 13

[56] References Cited

U.S. PATENT DOCUMENTS

| | | | |
|---|---|---|---|
| 4,225,109 | 9/1980 | Yotsutsuji et al. | 249/114.1 |
| 4,670,479 | 6/1987 | Mijiauchi . | |
| 4,734,488 | 3/1988 | Hasuo et al. . | |
| 4,774,315 | 9/1988 | Miller . | |
| 4,879,082 | 11/1989 | Kudo et al. | 264/1.3 |
| 4,902,735 | 2/1990 | Okamuto et al. . | |
| 4,977,233 | 12/1990 | Okamuto et al. . | |
| 4,997,903 | 3/1991 | Okamuto . | |
| 5,064,597 | 11/1991 | Kim | 249/135 |
| 5,068,065 | 11/1991 | Maus et al. | 264/1.3 |
| 5,242,630 | 9/1993 | Nuij et al. | 264/1.3 |

FOREIGN PATENT DOCUMENTS

| | | |
|---|---|---|
| 478372 | 4/1992 | European Pat. Off. . |
| 2319477 | 2/1977 | France . |
| 62-207358 | 9/1987 | Japan . |

*Primary Examiner*—Mathieu D. Vargot

[57] ABSTRACT

An insulated mold insert is provided for injection molding compact disks and optical disks. The mold insert is removably located in the mold cavity behind the stamper. The mold insert has an insulation layer retaining heat at the molding surface, thereby increasing surface smoothness of the molded part. The insert may have a metal surface for contacting the back side of the stamper.

31 Claims, 2 Drawing Sheets

INSULATED MOLD STRUCTURE FOR INJECTION MOLDING OF OPTICAL DISKS

BACKGROUND OF THE INVENTION

The present invention relates generally to insulated molds and more particularly to a mold insert useful in a process for molding optical and compact disks having reduced birefringence, improved pits replication and improved molding characteristics.

Various types of molds have long been in use for preparing shaped articles from thermoplastic resins. Molds for these purposes are typically manufactured from metal or a similar material having high thermal conductivity. For most purposes, high thermal conductivity is desirable since it permits the resin in the mold to cool rapidly, shortening the molding cycle time. At times, however, cooling is so rapid that the resin freezes instantaneously at the mold surface upon introduction into the mold, forming a thin solid layer which, especially if it contains a filler, can create rough surfaces, voids, porosity and high levels of residual stress and orientation. In an optical disk, such imperfections impede the optical properties and decrease or eliminate performance.

There have recently been disclosed multilayer molds in which a metal core has an insulating layer bonded thereto for the purpose of slowing the initial cooling of the resin during the molding operation. The insulating layer is fabricated of material having low thermal conductivity, thus slowing the cooling of the molded resin, and also having good resistance to high temperature degradation, permitting use in a mold maintained at high temperatures. In order to improve durability of the mold and improve surface quality one or more skin layers of hard material, typically metal, is bonded to the insulating layer. The skin layer may be deposited by such operations as electroless deposition, electrolytic deposition and combinations thereof. Due to the insulation, the skin layer retains heat during the molding operation, thereby avoiding the surface irregularities created by rapid surface cooling. Thus, these devices provide a surface with lower residual stress and less orientation than a conventionally molded part while maintaining a relatively short cycle time.

Depending on specific requirements, plastic parts can be made by any of a number of known molding processes such as blow molding, compression injection molding, molding and injection compression molding.

In compression molding, composite blanks of glass reinforced thermoplastic sheets are heated. The material is heated above its melting point or if an amorphous material at least substantially above its glass transition temperature. When the composite blanks are heated, they expand (loft) due to the recoil forces within the fibers. The hot blanks are then pressed between cool mold surfaces which are below the melting point or glass transition temperature. Contact with the cool mold surfaces results in frozen resin on the surface of the blank. This creates unfilled areas in the form of exposed fibers and surface porosity. The resin at the cold surface is frozen and does not flow. Thus, rough boundaries between the charged and newly formed areas are produced.

Injection molding involves injecting molten thermoplastic resin into a mold apparatus. Molds for injection molding of thermoplastic resin are usually made from metal material such as iron, steel, stainless steel, aluminum alloy or brass. Such materials are advantageous in that they have high thermal conductivity and thus allow the melt of thermoplastic resin to cool rapidly and shorten the molding cycle time. However, because of the rapid cooling, the injected resin freezes instantaneously at the mold surface, resulting in a thin solid layer. Quick quenching of the melt at the mold surface creates several problems. The freezing of these materials at the mold surfaces creates rough surfaces. Processing difficulties arise especially when producing thin parts requiring a high quality optical surface. The quick solidification of the melt combined with, for example, variable radial flowability of the materials makes it difficult to achieve the kind of uniform melt flow required for an optical disk. This is important when considering the quality of pits replication required for optical disks. Non-uniform flow can result in bad areas with high bit errors. The use of multiple gates is not generally thought to be a practical expedient to remedy non-uniform melt flow in an optical medium, because weld lines are produced which can cause optical flaws.

In injection compression molding which is a combined process, a hot thermoplastic melt is injected into a mold cavity. The parting line of the mold is positioned open or allowed to be forced open by the injected melt typically 0.05" to 0.3" inches. The clamping force is increased initiating the compression stroke of the mold forcing the melt to fill the cavity. In many instances the velocity of the melt front through the cavity changes as the injection stroke stops and the compression stroke begins. This distinct change in melt front velocity is often characterized by a stall followed by a surge in the melt front.

The problems associated with injection molding are likewise associated with injection compression molding. Another important issue to be considered in molding of high quality parts is the residual stress in such molded parts. Residual stress can result in dimensional instability and non-uniform birefringence. Dimensional stability and uniformity of birefringence are critically required for applications such as the manufacture of optical disks. For example, dimensional instability can result in differential expansion and contraction, which in turn can cause unacceptable variations in concentricity, eccentricity flatness of the medium.

Birefringence mechanisms, (i.e., retardation and the influence of molding and specific process conditions on residual retardation or optical path difference) are also crucial factors to be considered in connection with optical disk manufacture.

Retardation $\Gamma$ is defined as:

$$\Gamma = R\lambda \qquad (1)$$

Where R is phase retardation and $\lambda$ is the wave length of the source.

Birefringence, $\Delta n$, is then defined as:

$$\Delta n = \frac{R\lambda}{t} \qquad (2)$$

Where t is the thickness of the optical medium. Thus, birefringence is a dimensionless quantity.

Birefringence is a net effect through a sample, which is predominately molten at the cessation of flow. Thus, molecular orientation in the quenched skins and slowly cooled core have a direct effect on the retardation. Molecular orientation is proportional to the applied stress field creating the flow which is related to birefringence, according to the following expression:

$$\Delta n_{13} = (n_{11} - n_{33}) = C(\sigma_{11} - \sigma_{33}) \qquad (3)$$

for a simple shear flow where C is the stress-optical coefficient. This analysis can be taken a step further by relating the normal stress difference $(\sigma_{11}-\sigma_{33})$ to the shear stress, $\sigma_{12}$, as follows:

$$(\sigma_{11}-\sigma_{33}) \alpha \sigma^2_{12} \tag{4}$$

Hence, substituting equation (4) into equation (3) gives $$(n_{11}-n_{33})=K\sigma^2_{12} \tag{5}$$

where K is a constant and $n_{11}$ and $n_{33}$ are the refractive indices in the flow and cross-flow directions, respectively. The expression is valid for polystyrene melts and for low molecular weight polycarbonate. In an optical disk, the flow originates at the center of the disk and radially diverges towards the outer edges as the melt fills the cavity. Hence, rendering the birefringence profile uniform in a diverging radial flow field is not a simple task. Molecular orientation varies radially as the flow front speed (and wall shear stress) decreases.

The phase retardation, $\Gamma$, is usually expressed in terms of nanometers ($10^{-9}$ meters). Since CD's are nominally 1.2 mm thick, retardation is typically specified, rather than birefringence, and retardation will be used where appropriate in the discussion below.

Retardation may be measured with a commercial instrument marketed by Hinds International. The instrument is a system consisting of a 2 mW He—Ne laser ($\lambda$-632.8 nm), photoelastic modulator and lock-in amplifier. The output is stored in a Nicolet storage scope and then may be transferred to a floppy disk or x-y plotter. The wavelength of the He—Ne laser in the analyzer is 632.8 nm. This may be adjusted to $\lambda$-780 nm as a reference and the output multiplied by 2 for double pass values.

A typical retardation profile is minimal at the hub and outer edge and is maximum at the midpoint of the annular disk area. The difference between the maximum and minimum is $\Delta\Gamma$. To measure the profile, the disk is rotated in a direction perpendicular to the incident light which passes along a radial path from the outer edge to the hub. The rotating disk is then withdrawn along the same path resulting in a second measurement on the same disk. The maximum and minimum retardation may then be noted as well as the absolute difference $\Delta\Gamma$. The extreme ends, i.e., outer edge and hub, of the retardation signal may be ignored because they do not contain recorded information.

The definitive test of a compact disk is the audio quality when played by a CD player. Assuming good aluminum film deposition and a good stamper, the accuracy of the encoded digital information is a function of the optical properties of the substrate and the pits replication of the stamper from which it is pressed.

Requirements for optical storage media are much more stringent than those specified for CD's. Normal retardation is reduced to ±20 nm and off-axis retardation (30° off normal) must be below ±70 nm. A good birefringence profile is nearly isotropic. Both normal and off-axis measurements have relatively low, acceptable levels of retardation. In addition, the optical properties at each radial position should be as uniform as possible.

The interrelationship of process conditions, birefringence and pit replication is highly complex when manufacturing digital audio disks. The retardation profiles are a reliable measure of the effect which process conditions have on final optical properties. Circumferential variations reflect non-uniform heat transfer in the mold. Also, because the polycarbonate must cool against the nickel stamper with precise molding of the pits, heat transfer, here too, is important. Thus, improvement is required to render the heat transfer more uniform or at least more symmetrical about the central sprue.

SUMMARY OF THE INVENTION

The present invention is based upon the discovery that an insulated mold insert may be employed to manufacture high quality media disks, such as, optical disks, compact disks, and computer disks, having improved uniformity of birefringence and improved surface quality.

In one embodiment of the present invention, the insert backs up a mold surface or stamper employed for producing disks in an injection molding or injection compression molding apparatus. The insert comprises a structure including an insulation layer and optionally a hard, conductive skin layer. The insert has a free surface adapted to be in thermal contact with the rear of the mold surface. The thermal characteristics of the mold insert result in improved pits replication, reduced residual stress and orientation resulting in more uniform birefringence.

The invention also is directed to a method for molding media disks employing the molding apparatus herein described and particularly to optical, compact and data disks produced in accordance with said method and apparatus.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof may best be understood by reference to the following description taken in conjunction with the accompanying drawing figures in which:

DETAILED DESCRIPTION OF THE INVENTION

Figure 1:
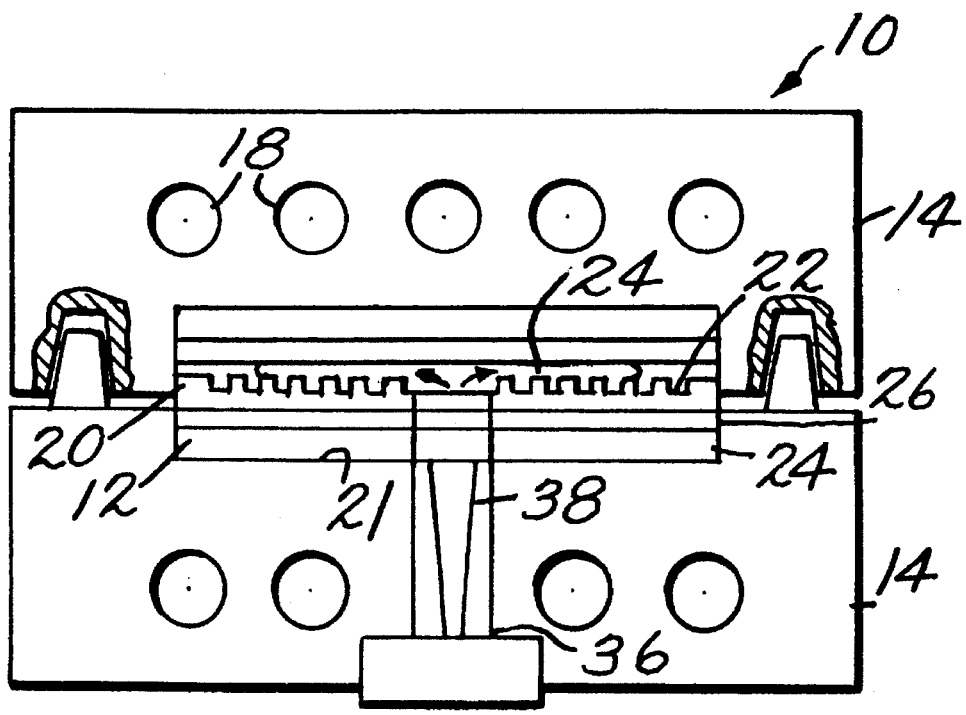
FIG. 1 is a fragmentary schematic side sectional elevation of an embodiment of the mold insert of the invention in an injection or injection compression molding apparatus.

Referring to the drawings wherein like numerals indicate like elements throughout, FIG. 1 schematically illustrates a side elevation of an injection or injection compression disk molding apparatus or mold 10 employing an insulated mold insert 12 of the present invention. The mold 10 comprises at least one and preferably a pair of mold halves or cores 14 of high thermally conductive material forming a mold cavity 16. Cooling lines 18, such as copper pipes, are provided in each core 14 for receiving a cooling fluid to reduce cycle time. At least one compact disk or optical disk stamper 20 is located in the mold cavity 16 as shown and secured therein in a known manner. The stamper 20 has an optical or pitted surface 22 which carries optical information.

Each core 14 has a surface 21 for supporting the mold insert 12 according to the invention. The insert 12 may be in the form of a single thin insulating layer 24 or multilayer insulated structure including a thin thermal insulating layer 24 and at least one outer skin layer 26. In either form of the invention, the thermal insulating layer 24 can be fabricated from low thermally conductive materials such as high temperature thermoplastics, thermosets, plastic composites, porous metals, ceramics and low-conductivity metal alloys. Other low thermally conductive materials used for insulation could also be used. In another form, the insulating layer may be a single layer of insulating film. Preferably, the insulating layer 24 may be a flexible film such as a polyimide film manufactured under the trademark KAPTON, from about 2 to about 20 mils, preferably, from about 2 to about 15 mils thick.

In another embodiment, the insulating layer 24 comprises a film of a polyimide resin available under the trademark EYMYD from the Ethyl Corporation, a film of EYMYD polyimide resin combined with one of several particulate fillers such as glass, $AlSiO_3$, $BASO_4$, $Al_2O_3$, etc., or a layer of filled EYMYD polyimide resin coated with a layer of non-filled EYMYD polyimide resin. The insulating layer 24 has a thickness sufficient to allow good thermal insulation during the molding step and allow a short cycle time. In the embodiment discussed herein, the insulation layer 24 has a thickness firm about 5 to about 20 mils.

The insulating layer may also be a resin such as polyimide, polyamideimide, polyethersulfone or polyetherketone, typically applied in uncured form (e.g., as a polyamic acid in the case of a polyimide or polyamideimide) and subsequently heat cured. However, the insulator can be made from any material with an adequately low thermal conductivity.

The resin form of the insulating layer 22 is often not mechanically strong and may not, when used alone, produce surfaces of high optical quality when used as a mold surface in a high pressure injection compression molding environment. Accordingly, at least one, outer skin layer 26 may be bonded to the upper front surface of the insulating layer 24, as shown.

Figure 2:
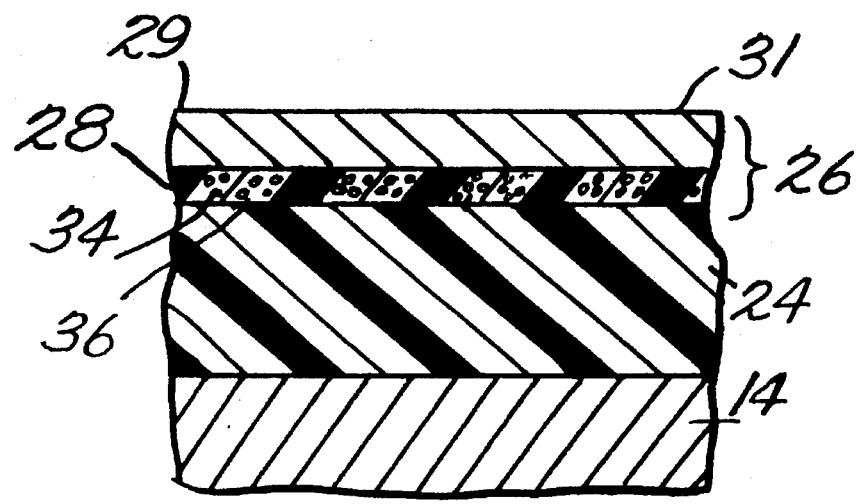
FIG. 2 is an enlarged fragmentary detail of the mold insert of the invention.

In accordance with a feature of the invention shown in FIG. 2, the outer skin layer 26 may be a composite including a primer layer 28 atop the insulation later 24 and a hard metallic layer 29 (e.g., electroless nickel) atop the primer layer 28. The primer portion 28 comprises a porous matrix of metallic particles 34 embedded in a continuous phase material 36. The particles 34 when used alone protect the continuous phase material 36. In addition, when used with the hard outer skin layer 29, the particles 36 are preferably of the same or a similar material. The hard skin layer 29 enters the porous matrix and bonds to the metal particles 34 forming anchoring points for enhancing adhesion of the outer skin layer 26 to the insulating layer 24. If desired, the outer skin layer 26 may also be bonded to the rear surface of the insulating layer 24, thereby forming a sandwich like insert. For a more detailed description of the outer skin layer, the teachings of which are incorporated herein by reference, reference is directed to U.S. patent application Ser. No. 08/107,863, filed Aug. 17, 1993, now pending on even date herewith, Attorney Docket No. 8CT-5478 and assigned to General Electric Company, the assignee herein.

The skin layer 26 must exhibit a number of desired properties. These properties include good mechanical strength, strong adhesion to the insulating layer 24, good abrasion resistance and high mechanical strength. Other important properties include thermal conductivity and oxidation resistance. In addition, the surface 31 of the skin layer 26 may be finished to an optical quality for abutment with the rear surface of the stamper 20 to effect good pits replication.

The skin layer 26 may be fabricated from other materials including carbon steel, stainless steel, nickel, aluminum, brass, copper, ceramics, glass, quartz, electrodeposited and electroless metal films, plastics and plastic composites. Metal alloys with a low. thermal expansion coefficient, such as INVAR ferronickel, can also be used. The layer 26 may also be formed of multiple metal layers including a thin sublayer disposed directly onto the insulating layer 24 which exhibits good adhesion strength as well as thermal conductivity and oxidation resistance. Examples of such materials are ENTHONE electroless nickel 422 and SHIPLEY electroless copper 250. Next, an intermediate sublayer may be disposed on the sublayer for mechanical strength and thermal conductivity. Examples of materials for such intermediate sublayer include a copper film or 42 LEA RONAL electrolytic nickel PC3, electrolytic copper and ENTHONE electroless nickel 426. A thin outer sublayer may be disposed on the intermediate layer to provide superior abrasion resistance. Suitable materials include Enthone electroless nickel 426, Englehard electrolytic palladium nickel 80/20, tin and chromium. The skin layer 26 may be a copper film in a copper film topped with nickel. Preferably, however, the skin layer 26 is a composite employing Ni particles 34 and a polymer matrix 36 and an overcoat of electroless nickel.

Hot thermoplastic resin 44 is injected from a source (not shown) into the mold cavity 16 via a sprue 46 and a gate 48. The sprue 46 may be coupled to a heated or cold inlet or runner, not shown.

In order to mold optical surfaces, the skin layer 26 which engages the stamper 20 may be provided with a mirror-surface finish such as a nickel plated copper composite for optical disk (OD) molding or a mirror-surface finish copper clad laminate for compact disk (CD) molding. Other alternatives for a CD mold insert 10 include a polyimide film sold under the KAPTON Trademark, or high temperature thermoplastic laminates such as filled thermoplastic, sold under the trademark ULTEM, optionally sandwiched between high gloss metal skins 26.

The present invention may use an insulating layer having a density variation across its thickness. More specifically, the insulating layer 24 may have a low density in the center region and a high density at each of the two surface regions. When the same material is used for each layer throughout the mold structure, the insulation properties of the insulating layer are due to the low density center region. That is, the center region has a lower thermal conductivity because of its porous nature. Also, because of the sameness of materials, the coefficient of thermal expansion (CTE) of the insulating layer will closely match the CTE of the adjacent core and skin layers. With the CTE of the adjacent layers closely matched, the potential of delamination is greatly reduced. Ceramic or metal materials are used when using the same material throughout the mold structure.

An insulating layer having a density variation across its thickness can be made by deposition of ceramics or metals using such deposition techniques as chemical vapor deposition, electroplating, and metal spraying, such as RF sputtering, electron beam deposition and plasma spraying. The low density area can be created by providing air bubbles or adding low density fillers such as hollow glass spheres, ceramics, metal oxides, bentonites, silica and the like in the center region.

In operation, the hot thermoplastic resin 44 is injected into the mold cavity 16, heat from the resin is absorbed through the stamper 20. Heat transfer, however, is regulated by the insert 12 which prevents quick cooling of the resin 44 and causes the stamper 20 to reheat. This results in a hot plastic surface at the interface between the stamper 20 and resin 44 for a short time period. The insert 12 and the stamper 20 cooperate to provide the desired surface quality to the finished part.

Passive heating of the hot thermoplastic need not be solely relied on. As set forth in U.S. Pat. No. 5,176,839 incorporated herein by reference, alternative forms of active heating (e.g., oven, RF, etc.), heating may be utilized.

The invention promotes uniform flow and minimization of stress molecular orientation during disk formation. These factors contribute to achievement of uniform or nearly uniform birefringence. Which, in turn, results in suppression of optical distortion, and promotes uniform pits formation.

In a conventional mold, the radially divergent flow results in high polymeric orientation near the hub and reduced polymeric orientation near the outer radius. Without the invention, the various orientation effects at different radii become frozen in as the disk cools. The invention, however, has a number of beneficial effects. First, the insulated insert causes the stamper 20 to reheat whereby the flow front experiences less restriction. Accordingly, the force necessary to move the resin in the mold is reduced. Thus, the resin experiences reduced stress and has reduced orientation. Further, the reheat relaxes, anneals or smooths out any stress that is imparted, so that the orientation is rendered more uniform. This is especially helpful near the central hub where the resin initially enters the cavity, where the reheat effects are greatest, and where the force and hence stress and orientation are greatest. Thus, the invention is most effective to reduce non-uniformities in flow rates, stress and orientation where it is most needed. The invention also relaxes momentarily frozen-in orientation thereby further relieving stress; and birefringence variations are reduced and rendered more uniform both radially and axially. The reheat effect of the invention also promotes accurate pits replication because the resin flow is improved. This is especially true near the outer edges of the disk when in prior systems the flow front velocity was impeded. Also, the viscosity increase with falling mold temperature adversely affected pits replication in prior systems. In the present invention, the viscosity of the flow front is such that pits replication is accurate and uniform across the disk.

According to the invention, various thermoplastic materials may be employed with the mold to produce finished products. Such plastics include polyamide materials sold under the trade designation "nylon 6" or "Nylon 12" or "Nylon 6,6"; and other polymers such as polyesters, such as poly(butylene terephthalate) (PBT), poly(ethylene terephthalate) (PET), and PBT with soft ether linkages formed of polycarbonate and methylene, polyether ketones, polyetherimides, polylactams, polypropylenes, polyethylenes, polystyrene (PS), styrene acrylonitrile, acrylonitrile butadiene terpolymers, polyphenylene oxide (PPO)/polystyrene and PPO/nylon and high impact styrenes filled or unfilled and blends thereof. Materials particularly suited for use in the invention, because of their versatility, strength and appearance include filled or unfilled polycarbonates, polyesters, polyphenylene oxide, acrylonitrile butidiene styrene (ABS), polyimide and polymeric combinations of such materials.

In addition to the foregoing, the following patents, the teachings of which are incorporated herein by reference disclose materials particularly useful for molding optical media such as optical disks and compact disks, and business machine parts which require optimum surface properties: Mille, U.S. Pat. Nos. 4,774,315 and 4,788,275; Okamuto, U.S. Pat. No. 4,997,903, Okamuto et al., U.S. Pat. Nos. 4,977,233 and 4,902,735; Hasuo et al., 4,734,488; Mijiauchi, U.S. Pat. No. 4,670,479 and Japanese Patent J62207-358-A. These references disclose various materials having an average molecular weight within the range from about 10,000 and about 18,000 suitable for the molding applications herein discussed as well as other applications of interest to those skilled in the art.

Figure 3:
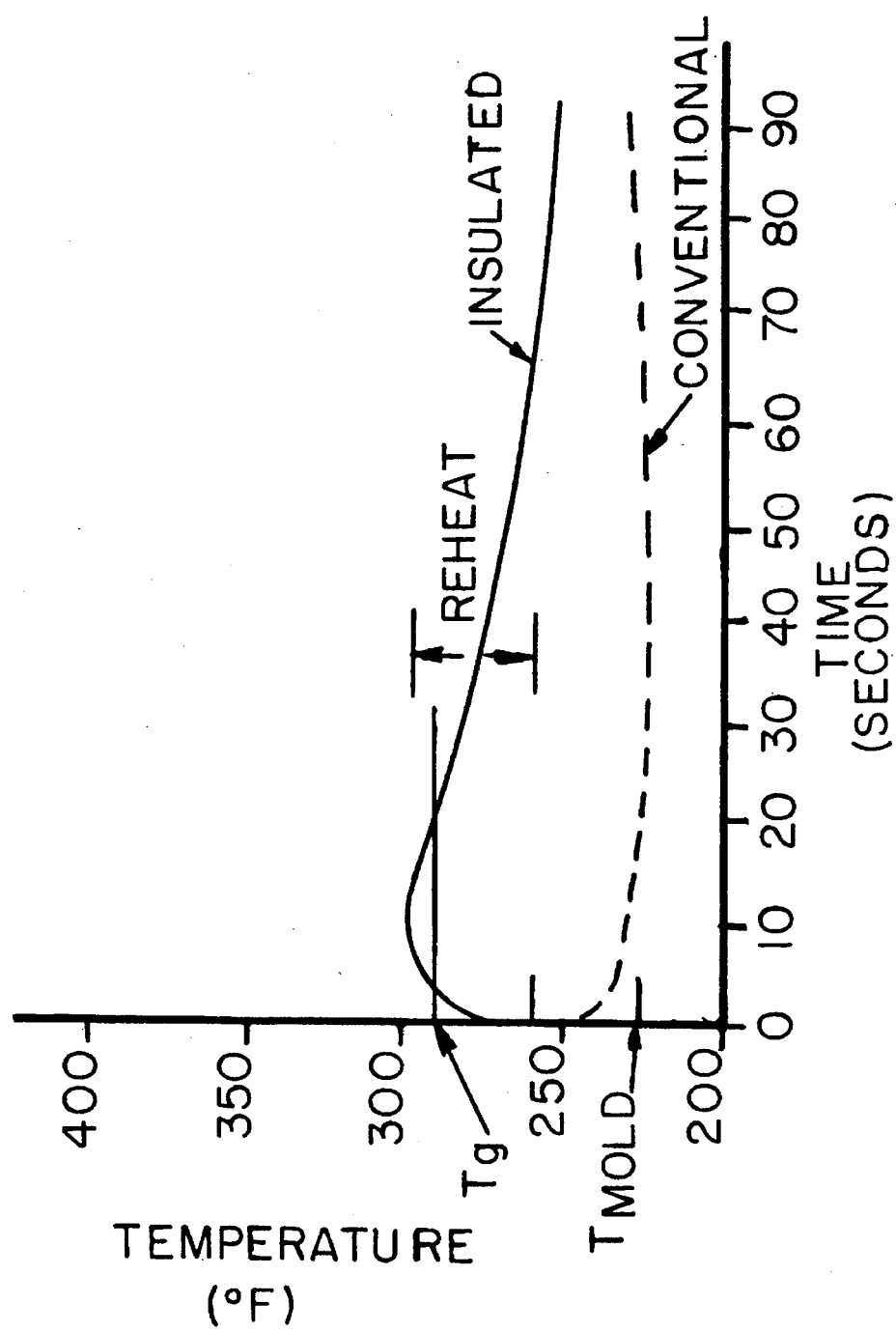
FIG. 3 is a comparative plot schematically showing the time temperature relationship of a thermoplastic material relative to the glass transition temperature $T_g$ in a conventional mold and in a mold according to the present invention.

FIG. 3 schematically shows the transient temperature response of the surface temperature of an article molded in accordance with the teachings of the present invention, in comparison to the temperature profile of an article manufactured by conventional processes. In conventional molding represented by the dotted line the thermoplastic material at time t=0 initially comes in contact with the mold surface. As can be seen, the thermoplastic material in conventional apparatus, without insulation, is immediately cooled below the glass transition temperature $T_g$. Such rapid cooling can cause rough surfaces in the finished article. On the other hand, with the insulated mold structure of the present invention, the thermoplastic material can be initially quenched by contact with the relatively cool skin of the mold and may temporally fall below the glass temperature $T_g$. However, the surface becomes reheated by the internal temperature of the hot molten thermoplastic material. Thus, the surface temperature increases to above the glass transition temperature, and the resin fills the mold thereby avoiding rough surfaces.

Satisfactory evaluations were conducted using a series of thin KAPTON polyimide films ranging from about 0.002" to about 0.015" thick. The film can be mounted under the nickel CD stamper 20 and held in place via the same retainer rings (not shown) used to hold the stamper in place during molding. This gives the molder the option of changing thickness of the insulation system without modifications to the tool. An insulating structure sandwiched between metal laminates of optically finished copper (for CDs) or nickel placed copper (for optical disks) or plated alloys can be used.

Also, because the stamper 20 is the exposed surface, it acts as the abrasion resistant layer obviating the strict need for an additional outer skin layer 29. If employed, however, the electroless nickel layer protects the insulator from scratches during stamper changes and provides a uniform, highly polished surface for the stamper to seat onto during molding.

While there has been described what are at present considered to be the preferred embodiments of the present invention, it will be apparent to those skilled in the art that various changes and modifications may be made therein without departing from the invention, and it is intended in the appended claims to cover such changes and modifications as fall within the spirit and scope of the invention.

What is claimed:

1. A molding apparatus having a stamper for molding molten thermoplastic materials into finished optical media comprising:

a support for receiving the stamper; and an insulating mold insert removably located between the support and the stamper for slowing initial cooling of the thermoplastic during molding, said insert having an insulating layer with a thickness dimension, the thickness dimension having a center region and two edge regions, and a density variation across the thickness dimension wherein the center region of the thickness dimension has a low density and the edge regions have a high density.

2. The molding apparatus of claim 1 wherein the insert includes at least one outer skin layer disposed for contact with the stamper.

3. The molding apparatus of claim 2 wherein the outer skin layer has a mirror finish.

4. The molding apparatus of claim 2 wherein the insert further includes an outer skin layer disposed for contacting the mold support.

5. The molding apparatus of claim 2 wherein the at least one outer skin layer comprises a plurality of sublayers comprising an outer sublayer and at least one inner sublayer.

6. The molding apparatus of claim 1 wherein the insulating mold insert comprises:

a first layer of temperature-resistant material having low thermal conductivity;

a second layer deposited on said first layer, comprising a suspension of metal particles in a temperature-resistant material having low thermal conductivity.

7. The molding apparatus of claim 6 further including an outer metallic skin formed on the second layer.

8. The molding apparatus of claim 1 wherein the insulating layer comprises a material selected from the group consisting of polyimides and polyamideimides.

9. The molding apparatus of claim 8 wherein the insulating layer is about 2 to about 20 mils thick.

10. A method for molding an optical medium comprising the steps of:

charging a molten thermoplastic material into a molding apparatus having a stamper and a support for receiving the stamper; and an insulating mold insert removably located between the support and the stamper for slowing initial cooling of the thermoplastic during molding, said insert having an insulating layer with a thickness dimension, the thickness dimension having a center region and two edge regions, and a density variation across the thickness dimension wherein the center region of the thickness dimension has a low density and the edge regions have a high density;

retaining the material in the mold for a time sufficient for the material to cool below its glass transition temperature to form the optical medium; and ejecting the optical medium from the mold.

11. The method of claim 10 wherein the insulating mold insert includes at least one outer skin layer disposed for contact with the stamper.

12. The method of claim 11 wherein the outer skin layer has a mirror finish.

13. The method of claim 10 wherein the insert comprises an insulating layer of temperature resistant material having a low thermal conductivity.

14. The method of claim 12 wherein the insulating layer comprises a material selected from the group consisting of polyimides and polyamideimides.

15. The method of claim 12 wherein the insulating layer is about 2 to about 20 mils thick.

16. The method of claim 10 wherein the insert comprises:

a first layer of temperature-resistant material having low thermal conductivity;

a second layer deposited on said first layer, comprising a suspension of metal particles in a temperature-resistant material having low thermal conductivity.

17. The method of claim 16 wherein the second layer further comprises a metal skin layer atop the second layer.

18. The method according to claim 10, wherein the thermoplastic material is a material, filled or unfilled, selected from the group consisting of polyamide, polyester, a copolymer of polybutadiene terepthalate with soft linkages formed of polycarbonate and methylene, polyether ketone, polyetherimide, polylactam, polypropylene, polyethylene, polystyrene, styrene-acrylonitrile, acrylonitrile-butadiene-styrene terpolymer, nylon and blends thereof.

19. The method according to claim 10 wherein the thermoplastic material is a material selected from the group consisting of filled or unfilled polycarbonate, polyester, polyphenylene oxide, acrylonitrile-butadiene-styrene, styrene-acrylonitrile, polyimide and polymeric combinations thereof.

20. A mold insert for a molding apparatus having a stamper for molding molten thermoplastic materials into finished optical media, and a support for receiving the stamper comprising an insulating layer insert removably located between the support and the stamper for slowing initial cooling of the thermoplastic during molding, said insulating layer insert having a thickness dimension, the thickness dimension having a center region and two edge regions, and a density variation across the thickness dimension wherein the center region of the thickness dimension has a low density and the edge regions have a high density.

21. The mold insert of claim 20 wherein the insulating layer insert comprises an insulating layer of temperature resistant material having a low thermal conductivity.

22. The mold insert of claim 21 wherein the insulating layer insert comprises a material selected from the group consisting of polyimides and polyamideimides.

23. The mold insert of claim 21 wherein the insulating layer insert is about 2 to about 20 mils thick.

24. The mold insert of claim 20 wherein the insulating layer insert comprises:

a first layer of temperature-resistant material having low thermal conductivity;

a second layer deposited on said first layer, comprising a suspension of metal particles in a temperature-resistant material having low thermal conductivity.

25. The mold insert of claim 24 further including an outer metallic skin formed on the second layer.

26. The mold insert of claim 20 including at least one outer skin layer disposed for contact with the stamper.

27. The mold insert of claim 26 wherein the outer skin layer has a mirror finish.

28. The mold insert of claim 20 wherein the insulating layer insert further includes an other skin layer disposed for contacting the support.

29. The mold insert of claim 28 wherein the at least one outer skin layer comprises a plurality of sublayers comprising an outer sublayer and at least one inner sublayer.

30. The mold insert of claim 29 wherein the plurality of sublayers comprises first, second and third sublayers.

31. The mold insert of claim 20 wherein the insulating layer insert comprises a material selected from the group consisting of polyimides and polyamideimides.

* * * * *